(12) United States Patent
Minami

(10) Patent No.: US 6,864,923 B2
(45) Date of Patent: Mar. 8, 2005

(54) EDGE CORRECTION CIRCUIT

(75) Inventor: Kouji Minami, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 464 days.

(21) Appl. No.: 09/988,317

(22) Filed: Nov. 19, 2001

(65) Prior Publication Data
US 2002/0167614 A1 Nov. 14, 2002

(30) Foreign Application Priority Data
May 9, 2001 (JP) .................................... 2001-138163

(51) Int. Cl.$^7$ ............................................... H04N 5/21
(52) U.S. Cl. ..................... 348/625; 348/252; 348/627; 382/266; 382/269
(58) Field of Search ................................ 348/625–630, 348/252–253; 382/263, 266–269; H04N 5/21

(56) References Cited

U.S. PATENT DOCUMENTS

| | | | | |
|---|---|---|---|---|
| 6,088,065 A | * | 7/2000 | Uchida ........................ | 348/625 |
| 6,094,205 A | * | 7/2000 | Jaspers ....................... | 348/625 |
| 6,278,494 B1 | * | 8/2001 | Kanai et al. ................ | 348/625 |
| 6,590,617 B1 | * | 7/2003 | Kanai et al. ................ | 348/625 |
| 6,614,474 B1 | * | 9/2003 | Malkin et al. .............. | 348/252 |
| 6,795,588 B1 | * | 9/2004 | Nio et al. .................... | 382/261 |
| 2002/0047933 A1 | * | 4/2002 | Vlahos et al. .............. | 348/627 |

FOREIGN PATENT DOCUMENTS

| | | |
|---|---|---|
| JP | 5-244462 | 9/1993 |
| JP | 11-355610 | 12/1999 |

* cited by examiner

Primary Examiner—Michael H. Lee
Assistant Examiner—Brian P. Yenke
(74) Attorney, Agent, or Firm—Birch, Stewart, Kolasch & Birch, LLP

(57) ABSTRACT

In an edge correcting circuit of an image to be represented by a digitized image signal, a high-frequency signal extracting circuit (5) extracts a high-frequency signal of the image by calculation based on a signal of a target pixel, a signal of a pixel shifted from the target pixel by m (m being an integer not smaller than 2) pixels in the right or lower direction, and a signal of a pixel shifted from the target pixel by m pixels in the left or upper direction, an amplitude-restricting signal generator (6) determines an amplitude-restricting signal (Si) based on a minimum value or a maximum value of an absolute value of a difference between the signal of the target pixel and a signal of a pixel shifted from the target pixel by n (n being an integer not smaller than 1 and smaller than m) pixels in the right or lower direction, and an absolute value of a difference between the signal of the target pixel and a signal of a pixel shifted from the target pixel by n pixels in the left or upper direction, an amplitude restricting circuit (7) restricts the output of the high-frequency extracting circuit (5) to the output of the amplitude-restricting signal generator (6), and an adder (8) adds the output (Si) of the amplitude restricting circuit (7) or a signal obtained therefrom, as an edge correction signal (Sj, Sq), to the signal (Sc) of the target pixel. It is possible to obtain an edge-corrected image signal with the horizontal or vertical overshoots having been reduced or removed.

15 Claims, 16 Drawing Sheets

Sa

Sb

Sc

Sd

Se

Sf

Sc

Sf

Sg

Sh

Si

Sj

Sp

Sc

Sf

Sg

Sh

Si

Sj

Sk

Sp

FIG. 10A Sc
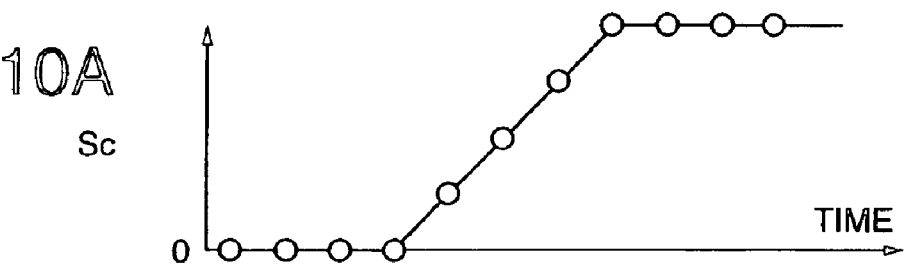
FIG. 10B Sf
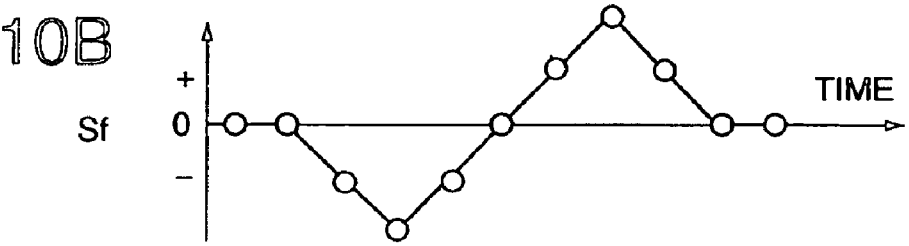
FIG. 10C Sm
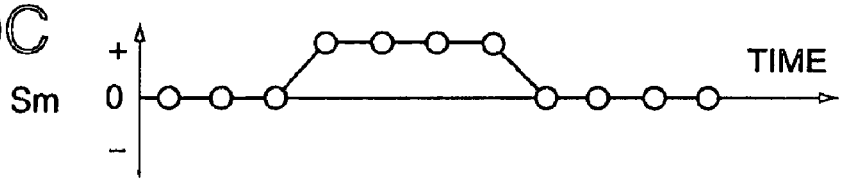
FIG. 10D Sn
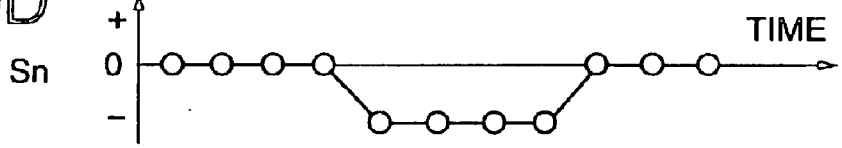
FIG. 10E Sr
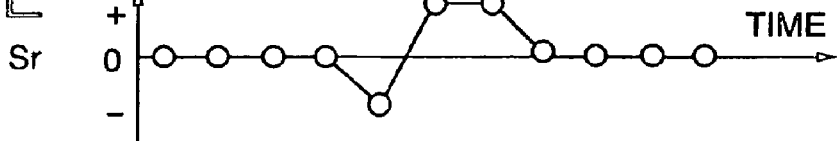
FIG. 10F Sj
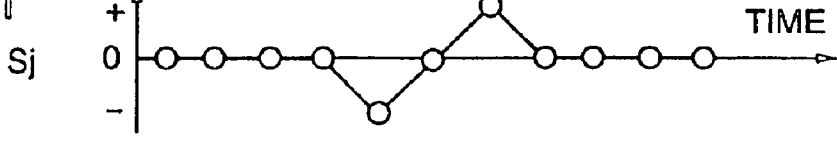
FIG. 10G Sp
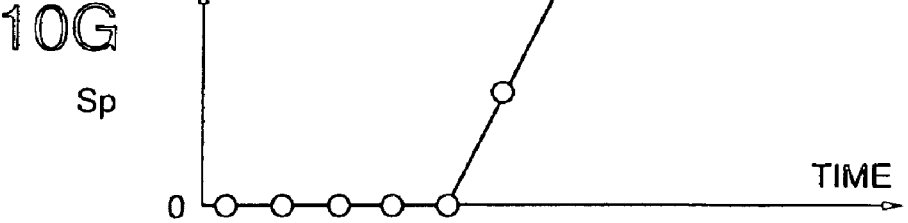

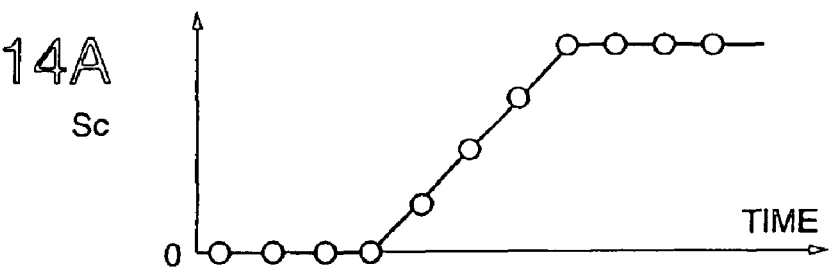
FIG. 14A Sc
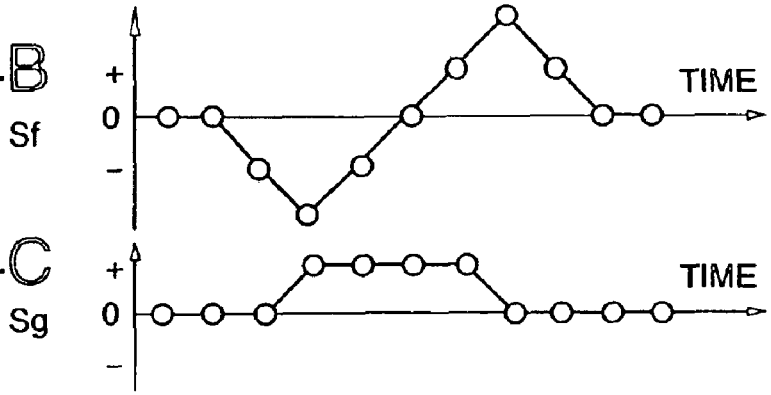
FIG. 14B Sf
FIG. 14C Sg
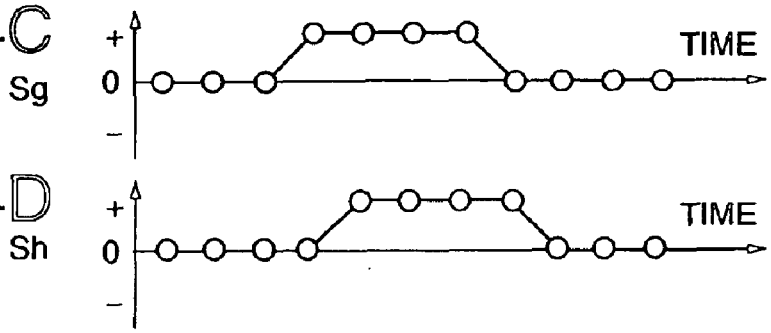
FIG. 14D Sh
FIG. 14E Si
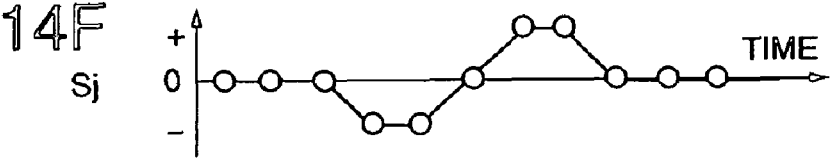
FIG. 14F Sj
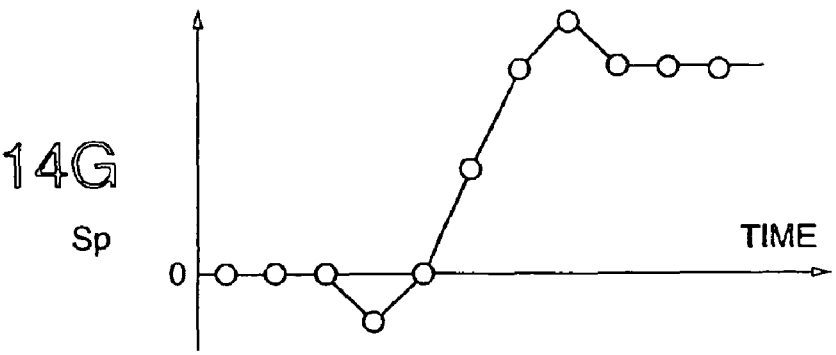
FIG. 14G Sp Sa Sc Se Sf Sp

EDGE CORRECTION CIRCUIT

BACKGROUND OF THE INVENTION

The present invention relates to an edge correcting circuit for correcting the edge of the image represented by a digital image signal.

In a display device used as a display terminal for a personal computer or a television set, edge correction by means of digital signal processing is adopted as a method for enhancing the edge of the displayed image to improve the sharpness. Generally, a high-frequency signal is extracted by passing the digital image signal through digital filters, and adding the high-frequency signal to the original signal, to obtain the edge-corrected image signal.

FIG. 16 is a diagram showing a conventional edge correcting circuit. This edge correcting circuit comprises an input terminal 101 for receiving a digital image signal Sa, a one-pixel delay unit 1 for delaying the signal Sa by one pixel period to output a signal Sb, a one-pixel delay unit 2 for delaying the signal Sb by one pixel period to output a signal Sc, a one-pixel delay unit 3 for delaying the signal Sc by one pixel period to output a signal Sd, a one-pixel delay unit 4 for delaying the signal Sd by one pixel period to output a signal Se, a high-frequency extracting circuit 5 formed of digital filters, an adder 8, and an output terminal 102 for outputting the edge-corrected image signal.

The operation of the conventional edge correcting circuit will next be described with reference to FIGS. 17A to 17E.

First, let us assume that an image signal Sa shown in FIG. 17A is applied to the input terminal 101. The image signal Sa is successively delayed by the one-pixel delay units 1, 2, 3 and 4 to result in the signals Sb, Sc, Sd and Se. FIGS. 17B and 17C show the signals Sc and Se.

The high-frequency signal extracting circuit 5 performs calculation using the signals Sa, Sc and Se, to produce a high-frequency signal Sf shown in FIG. 17D. The signal FIG. 17D is a high-frequency signal whose amplitude is maximum at the rising and falling parts of the input signal (Sa).

As an example, the high-frequency signal extracting circuit 5 multiplies the input signals Sa, Sc and Se by the coefficients $-\frac{1}{4}$, $\frac{1}{2}$ and $-\frac{1}{4}$, and adds the products together, and adjusts the amplitude as required. When the amplitude is quadrupled by the amplitude adjustment, the output signal Sf will represents Sf=−Sa+2Sc−Se, as illustrated.

The high-frequency signal Sf output from the high-frequency extracting circuit 5 is added at the adder 8 to the original signal Sc with its delay due to the high-frequency extracting circuit 5 compensated. As a result, a signal Sp obtained by the edge-correction is as shown in FIG. 17E. In FIG. 17E, values less than 0 are shown, but in the case where the signal is used for display in a display device, the values less than 0 are clipped.

The conventional edge correcting circuit as described above is associated with excessive overshoots and undershoots (they both will be referred to simply as "overshoots") at the edge parts. It is possible to make the overshoot less prominent by reducing the high-frequency signal by the amplitude adjustment within the high-frequency extracting circuit 5, but in that case the necessary edge enhancement cannot be made adequately.

SUMMARY OF THE INVENTION

The invention has been made to solve the problems described above, and its object is to provide an edge correcting circuit which can reduce or eliminate the overshoot, and which can fully achieve the necessary edge enhancement.

According to one aspect of the invention, there is provided an edge correcting circuit of an image to be represented by a digitized image signal, comprising:

a high-frequency signal extracting circuit for extracting a high-frequency signal of the image by calculation based on a signal of a pixel which is to be corrected (hereinafter called a target pixel), a signal of a pixel shifted from the target pixel by m (m being an integer not smaller than 2) pixels in the right or lower direction, and a signal of a pixel shifted from the target pixel by m pixels in the left or upper direction;

an amplitude-restricting signal generator for determining an amplitude-restricting signal based on a minimum value or a maximum value of an absolute value of a difference between the signal of the target pixel and a signal of a pixel shifted from the target pixel by n (n being an integer not smaller than 1 and smaller than m) pixels in the right or lower direction, and an absolute value of a difference between the signal of the target pixel and a signal of a pixel shifted from the target pixel by n pixels in the left or upper direction;

an amplitude restricting circuit for restricting the output of the high-frequency extracting circuit so that the absolute value of the output of the high-frequency extracting circuit is not more than the output of the amplitude-restricting signal generator; and an adder for adding the output of the amplitude restricting circuit or a signal obtained therefrom, as an edge correction signal, to the signal of the target pixel.

With the above arrangement, it is possible to obtain an edge-corrected image signal with the horizontal or vertical overshoots having been reduced or removed.

The high-frequency extracting circuit may have the function of altering the amplitude of the high-frequency signal output therefrom.

With the above arrangement, the amount of the edge enhancement can be adjusted depending on the state of the input signal.

The amplitude-restricting signal generator may have the function of altering the amplitude of the amplitude-restricting signal output therefrom.

With the above arrangement, it is possible to adjust the amount of overshoot mixed, so as to realize a desired degree of sharpness.

The edge correcting circuit may further comprise:

a subtractor for subtracting the output of the amplitude restricting circuit from the output of the high-frequency extracting circuit;

an amplitude control circuit for controlling the amplitude of the output of the subtractor; and a second adder for adding the output of the amplitude control circuit and the output of the amplitude restricting circuit;

wherein the output of the second adder is used as the edge correction signal.

With the above arrangement, it is possible to adjust the overshoot components and the components improving the edge inclination independently of each other, so as to optimize the edge correction.

The edge correcting circuit may further comprise:

a subtractor for subtracting the output of the amplitude restricting circuit from the output of the high-frequency extracting circuit;

an amplitude adjusting circuit for adjusting the amplitude of the output of the amplitude restricting circuit; and a second adder for adding the output of the subtractor and the output of the amplitude adjusting circuit;

wherein the output of the second adder is used as said edge correction signal.

With the above arrangement, it is possible to adjust the overshoot components and the components improving the edge inclination independently of each other, so as to optimize the edge correction.

According to another aspect of the invention, there is provided an edge correcting circuit of an image to be represented by a digitized image signal, comprising:

a high-frequency signal extracting circuit for extracting a high-frequency signal of the image by calculation based on a signal of a pixel which is to be corrected (hereinafter called a target pixel), a signal of a pixel shifted from the target pixel by m (m being an integer not smaller than 2) pixels in the right or lower direction, and a signal of a pixel shifted from the target pixel by m pixels in the left or upper direction;

an amplitude-restricting signal generator for determining an amplitude-restricting signal based on a difference between the signal of the target pixel and a signal of a pixel shifted from the target pixel by n (n being an integer not smaller than 1 and smaller than m) pixels in the right or lower direction, and a difference between the signal of the target pixel and a signal of a pixel shifted from the target pixel by n pixels in the left or upper direction;

an amplitude restricting circuit for restricting the output of the high-frequency extracting circuit so that the absolute value of the output of the high-frequency extracting circuit is not more than the output of the amplitude-restricting signal generator; and an adder for adding the output of the amplitude restricting circuit or a signal obtained therefrom, as an edge correction signal, to the signal of the target pixel;

wherein said amplitude-restricting signal generator outputs "0" when a first difference value obtained by subtracting the signal of the target pixel from the signal of the pixel shifted by n pixels from the target pixel in the right or lower direction, and a second difference value obtained by subtracting the signal of the target pixel from the signal of the pixel shifted by n pixels from the target pixel in the left or upper direction are of the same sign (or at least one of them is zero), and said amplitude-restricting signal generator selectively outputs that one of the first and second difference values which is of the same sign as the output of the high-frequency extracting circuit, when neither of the first and second difference values is zero, and the first and second difference values have different signs.

With the above arrangement, it is possible to obtain an edge-corrected image signal with the horizontal or vertical overshoots having been reduced or removed.

The high-frequency extracting circuit may have the function of altering the amplitude of the high-frequency signal output therefrom.

With the above arrangement, the amount of the edge enhancement can be adjusted depending on the state of the input signal.

The amplitude-restricting signal generator may have the function of altering the amplitude of the amplitude-restricting signal output therefrom.

With the above arrangement it is possible to adjust the amount of overshoot mixed, so as to realize a desired degree of sharpness.

The edge correcting circuit may further comprise:

a subtractor for subtracting the output of the amplitude restricting circuit from the output of the high-frequency extracting circuit;

an amplitude control circuit for controlling the amplitude of the output of the subtractor; and a second adder for adding the output of the amplitude control circuit and the output of the amplitude restricting circuit;

wherein the output of the second adder is used as the edge correction signal.

With the above arrangement, it is possible to adjust the overshoot components and the components improving the edge inclination independently of each other, so as to optimize the edge correction.

The edge correcting circuit may further comprise:

a subtractor for subtracting the output of the amplitude restricting circuit from the output of the high-frequency extracting circuit;

an amplitude adjusting circuit for adjusting the amplitude of the output of the amplitude restricting circuit; and a second adder for adding the output of the subtractor and the output of the amplitude adjusting circuit;

wherein the output of the second adder is used as said edge correction signal.

With the above arrangement, it is possible to adjust the overshoot components and the components improving the edge inclination independently of each other, so as to optimize the edge correction.

BRIEF DESCRIPTION OF THE DRAWINGS

In the drawings:

FIGS. 10A to 10G are diagrams showing signals appearing at various parts of the circuit of Embodiment 3 of the invention;

FIGS. 14A to 14G are diagrams showing signals appearing at various parts of the circuit of Embodiment 5 of the invention;

DETAILED DESCRIPTION OF THE PREFERRED EMBODIMENTS

Embodiments of the invention will next be described with reference to FIG. 1 to FIG. 15.

Embodiment 1

Figure 1:
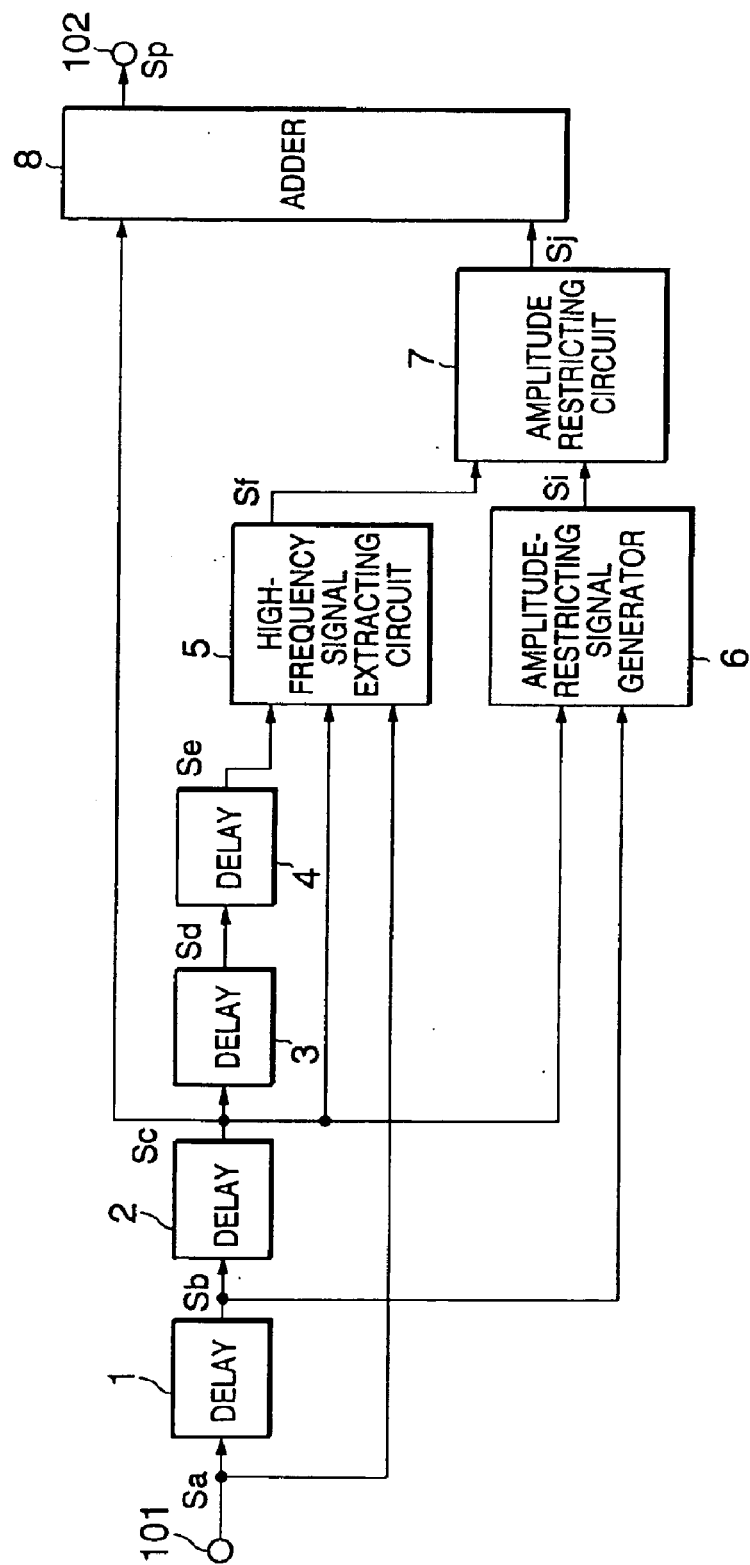
FIG. 1 is a block diagram showing an edge correcting circuit of Embodiment 1 of the invention.

FIG. 1 is an edge correcting circuit of Embodiment 1 of the invention. FIGS. 2A to 2F, and FIGS. 3A to 3G show signals at various parts of the edge correcting circuit.

As shown in FIG. 1, the edge correcting circuit has an input terminal 101 for receiving a digitized image signal Sa formed of a sequence of digitized pixel signals representing luminance or colors of respective pixels, four one-pixel delay units 1, 2, 3 and 4 connected in series with each other, a high-frequency extracting circuit 5, an amplitude-restricting signal generator 6, an amplitude restricting circuit 7, an adder 8, and an output terminal 102 for outputting the edge-corrected image signal.

The image signal Sa input to the input terminal 101 is delayed successively by the one-pixel delay units 1, 2, 3 and 4 to become output signals Sb, Sc, Sd and Se (FIG. 2B, FIG. 2C, FIG. 2D and FIG. 2E) of the respective delay units.

Figure 2A:
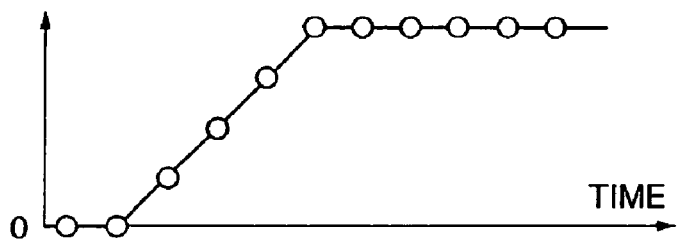
FIGS. 2A to 2F are diagrams showing signals appearing at various parts of the circuit of Embodiment 1 of the invention.
Figure 2B:
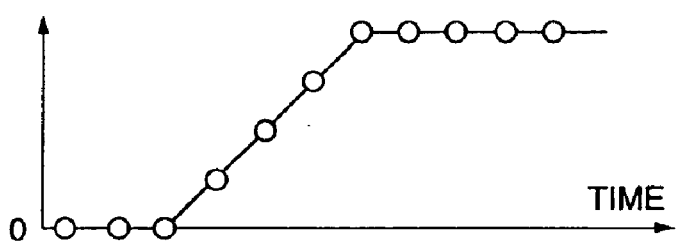
Figure 2C:
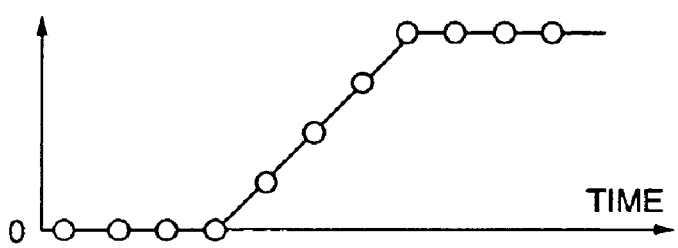
Figure 2D:
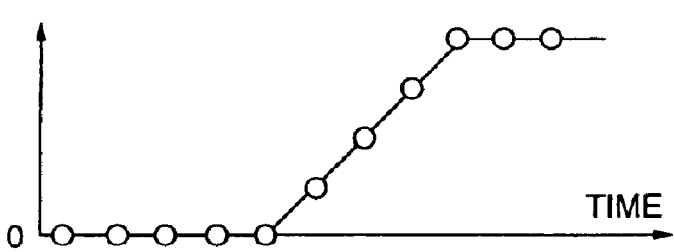
Figure 2E:
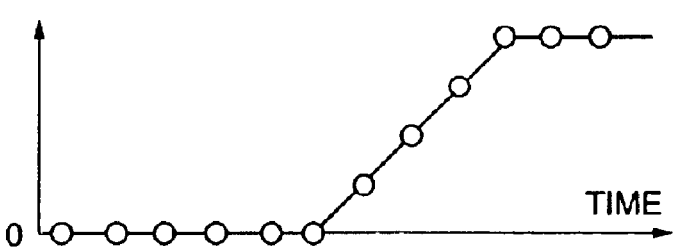
Figure 2F:
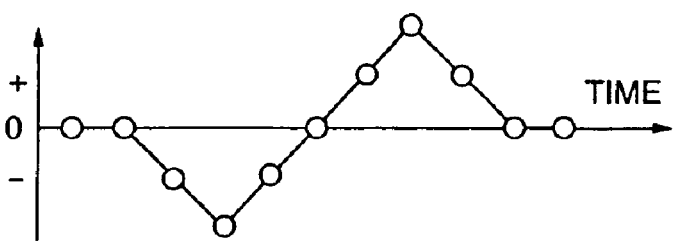

The high-frequency extracting circuit 5 is formed of digital filters, and performs a predetermined calculation on them, to generate a high-frequency signal Sf shown in FIG. 2F. The signal Sf is a high-frequency signal with its magnitude being maximum at the rising and falling parts of the input signal.

Figure 4:
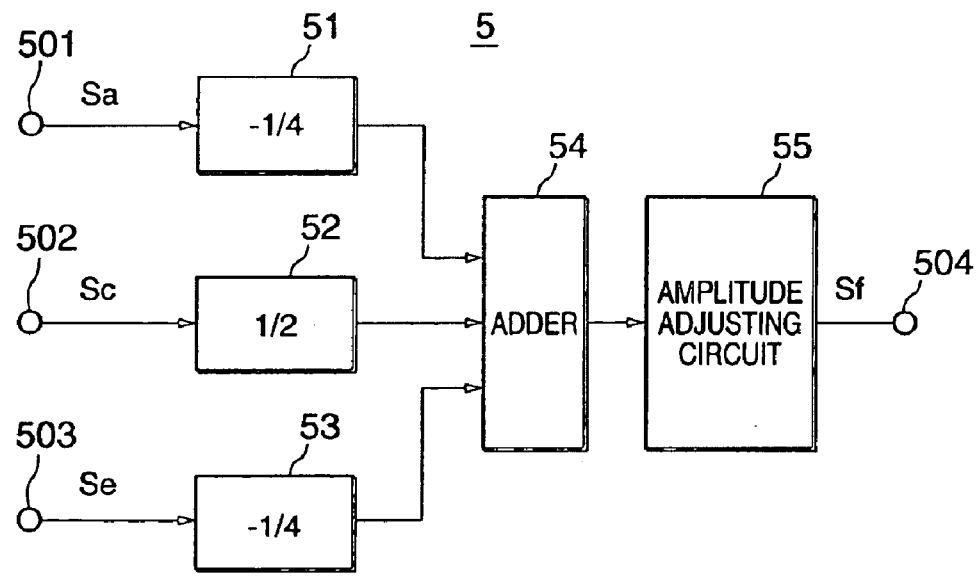
FIG. 4 is a block diagram showing a high-frequency signal extracting circuit used in Embodiment 1 of the invention.

FIG. 4 shows details of the high-frequency extracting circuit 5. As illustrated, the high-frequency extracting circuit 5 has an input terminal 501 receiving the signal Sa, an input terminal 502 receiving the signal Sc, an input signal 503 receiving the signal Se, coefficient multipliers 51, 52, and 53 multiplying the signals input at the input terminals 501, 502 and 503 by coefficients $-\frac{1}{4}$, $\frac{1}{2}$, and $-\frac{1}{4}$, an adder 54 for adding together the outputs of the coefficient multipliers 51, 52 and 53, and an amplitude adjusting circuit 55 for adjusting the amplitude of the output of the adder 54.

The signal Sc is called a signal of a target pixel for the reason explained later. The signal Sa is a signal of a pixel shifted rightward by two pixels from the target pixel, and the signal Se is a signal of a pixel shifted leftward by two pixels from the target pixel.

The signals Sa, Sc and Se are multiplied by coefficients $-\frac{1}{4}$, $\frac{1}{2}$ and $-\frac{1}{4}$ at the coefficient multipliers 51, 52 and 53, and the products are added together at the adder 54. The output of the adder 54 is input to the amplitude adjusting circuit 55 where its amplitude is adjusted, and the amplitude-adjusted signal Sf is supplied to the output terminal 504. The amplitude adjusting circuit 55 varies the amount of edge enhancement in accordance with the state of the input signal.

FIGS. 2A to 2F show the case where the amplitude is quadrupled by the amplitude adjusting circuit 55. In this case, the signal Sf will be given by f=−Sa+2Sc−Se. The output terminal 504 is connected to the input of the amplitude restricting circuit 7.

Figure 5:
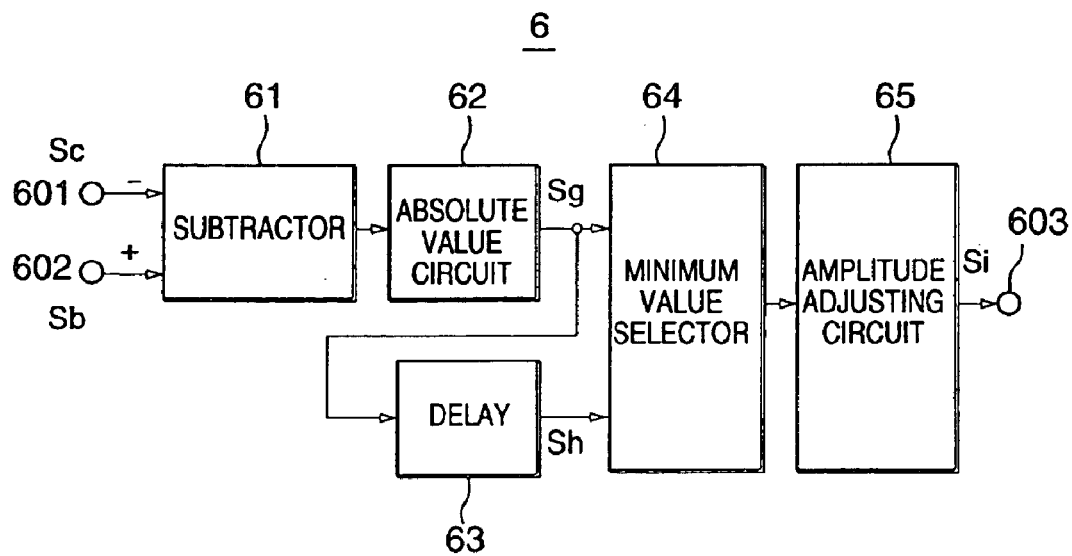
FIG. 5 is a block diagram showing an amplitude-restricting signal generator used in Embodiment 1 of the invention.

The amplitude-restricting signal generator 6 generates the amplitude-restricting signal Si based on the signals Sb and Sc, and supplies it to the amplitude restricting circuit 7. FIG. 5 shows details of the amplitude-restricting signal generator 6. As illustrated, it comprises an input terminal 601 for receiving the signal Sc, an input terminal 602 for receiving the signal Sb, a subtractor 61 for subtracting the signal Sc from the signal Sb, an absolute value circuit 62 for determining the absolute value Sg (FIG. 3C) of the result of the subtraction at the subtractor 61, a one-pixel delay unit 63 for delaying the output of the absolute value circuit 62 by one pixel period to output a delayed signal Sh, a minimum value selector 64, and an amplitude adjusting circuit 65.

The delayed signal Sh is equivalent to the absolute value of the difference between the signals Sc and Sd. The minimum value selector 64 receives the signals Sg and Sh and selectively outputs the smaller one of them. The amplitude adjusting circuit 65 adjusts the amplitude of the output of the minimum value selector 64, and supplies the signal shown in FIG. 3E, to the output terminal 603. The output terminal 603 is connected to the input of the amplitude restricting circuit 7.

Figure 6:
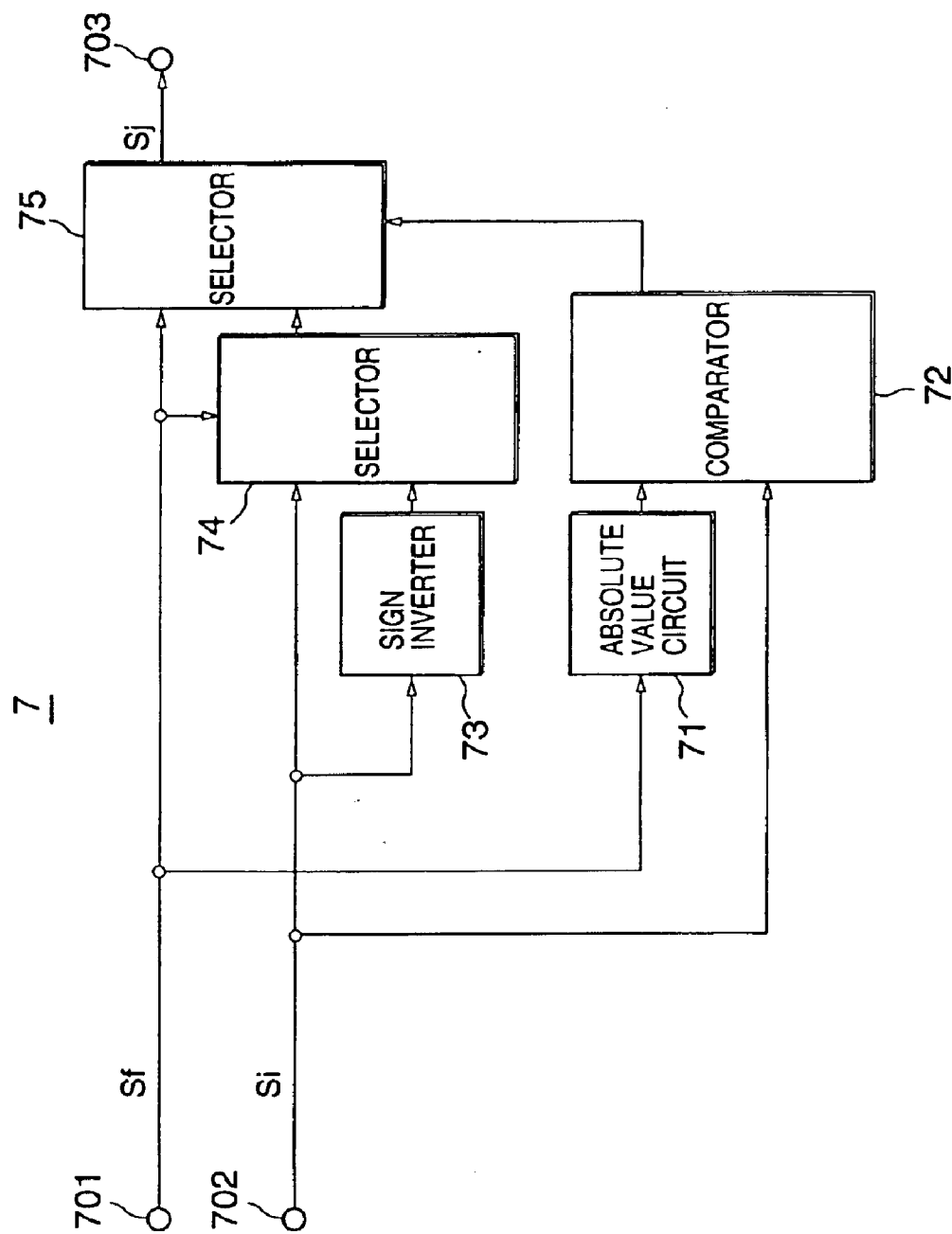
FIG. 6 is a block diagram showing an amplitude restricting circuit used in Embodiment 1 of the invention.

The amplitude restricting circuit 7 restricts the amplitude so that the absolute value of the input high-frequency signal Sf does not exceed the amplitude-restricting signal Si, and supplies the amplitude-restricted high-frequency signal Sj to the adder 8. FIG. 6 shows details of the amplitude restricting circuit 7. As illustrated, the amplitude restricting circuit 7 has an input terminal 701 for receiving the output signal Sf of the high-frequency extracting circuit 5, an input terminal 702 for receiving the output signal Si of the amplitude-restricting signal generator 6, an absolute value circuit 71 for determining the absolute value of the signal Sf, and a comparator 72 for comparing the output signal of the absolute value circuit 71 with the signal Si, a sign inverting circuit 73 for inverting the sign of the signal Si, a first selector 74, a second selector 75, and an output terminal 203.

Figure 3A:
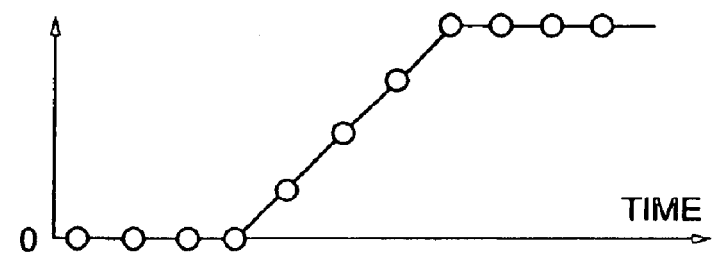
FIGS. 3A to 3G are diagrams showing signals appearing at various parts of the circuits of Embodiment 1 of the invention.
Figure 3B:
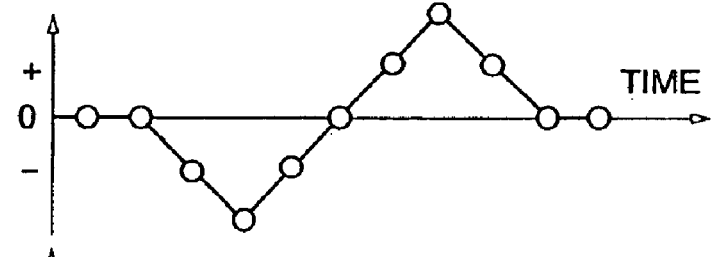
Figure 3C:
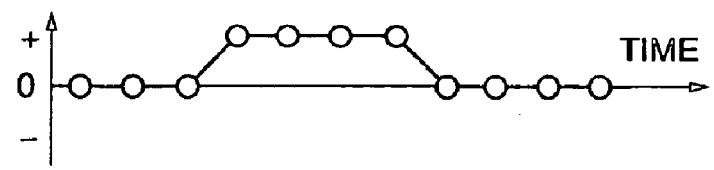
Figure 3D:
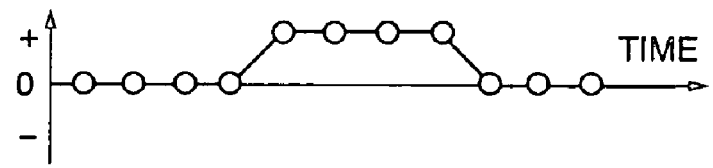
Figure 3E:
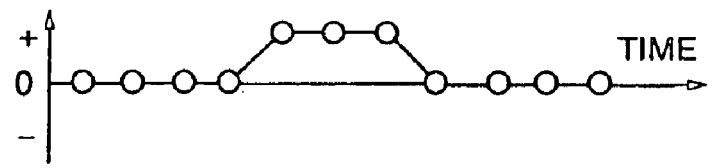
Figure 3F:
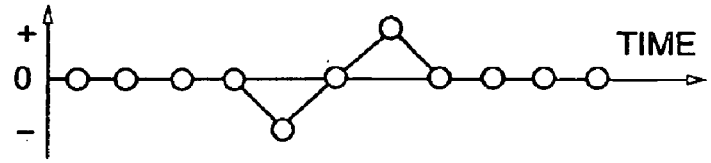

The first selector 74 selectively outputs the signal Si when the sign of the signal Sf is positive, and selectively outputs the output signal of the sign inverting circuit 73 when the sign of the signal Sf is negative. The second selector 75 selects the signal Sf when the output signal of the absolute value circuit 71 is smaller than the signal Si, and selects the output signal of the selector 74 at other times, and outputs the signal Sj as shown in FIG. 3F. The output signal Sj of the selector 75 is supplied via the output terminal 703 to the adder 8.

The adder 8 adds the amplitude-restricted high-frequency signal Sj to the signal Sc of the target pixel output from the one-pixel delay unit 2, and supplies the edge-corrected image signal Sp to the output terminal 102. The reason for using the output Sc of the one-pixel delay unit 2 as the signal of the target pixel (original signal) is to compensate for the delay due to the processing.

By the operations described above, the output signal Sf of the amplitude restricting circuit 7 will become the signal Sj after the amplitude of its absolute value is restricted to be not larger than the output signal Si of the amplitude-restricting signal generator 6. The signal Sj is a high-frequency signal having its overshoot components removed, so that it is called "inclination-improving signal" in the present specification.

Figure 3G:
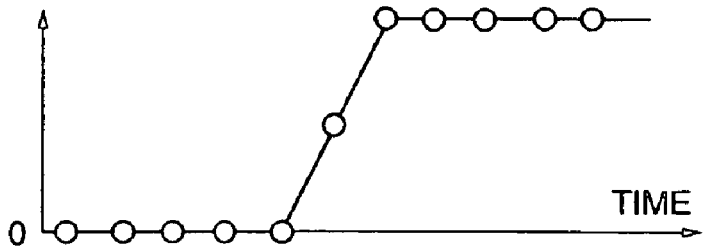

The inclination-improving signal Sj and the original signal Sc having its delay due to the processing for extracting the inclination-improving signal Sj compensated are added together at the adder 8, to become an edge-corrected signal Sp shown by solid line Sp in FIG. 3G.

As has been described, by applying an amplitude-restriction to the high-frequency signal Sf by means of the amplitude-restricting signal Si, the edge-corrected signal Sp with the overshoots removed can be obtained.

In Embodiment 1, an image signal having the overshoots removed is obtained. But there are instances in which the image formed of signals with a certain amount of overshoots look sharper and better. In such a case, the amplitude adjusting circuit 65 forming part of the amplitude-restricting signal generator 6 may be used to vary and increase the amplitude of the amplitude-restricting signal Si so as to include overshoot components a little.

If the amplitude at the amplitude adjusting circuit 65 is adjusted as described above, so as to reduce the overshoots to an appropriate degree, rather than removing them completely, it is possible to obtain edge-corrected image signals having sharpness as well.

Embodiment 2

Figure 7:
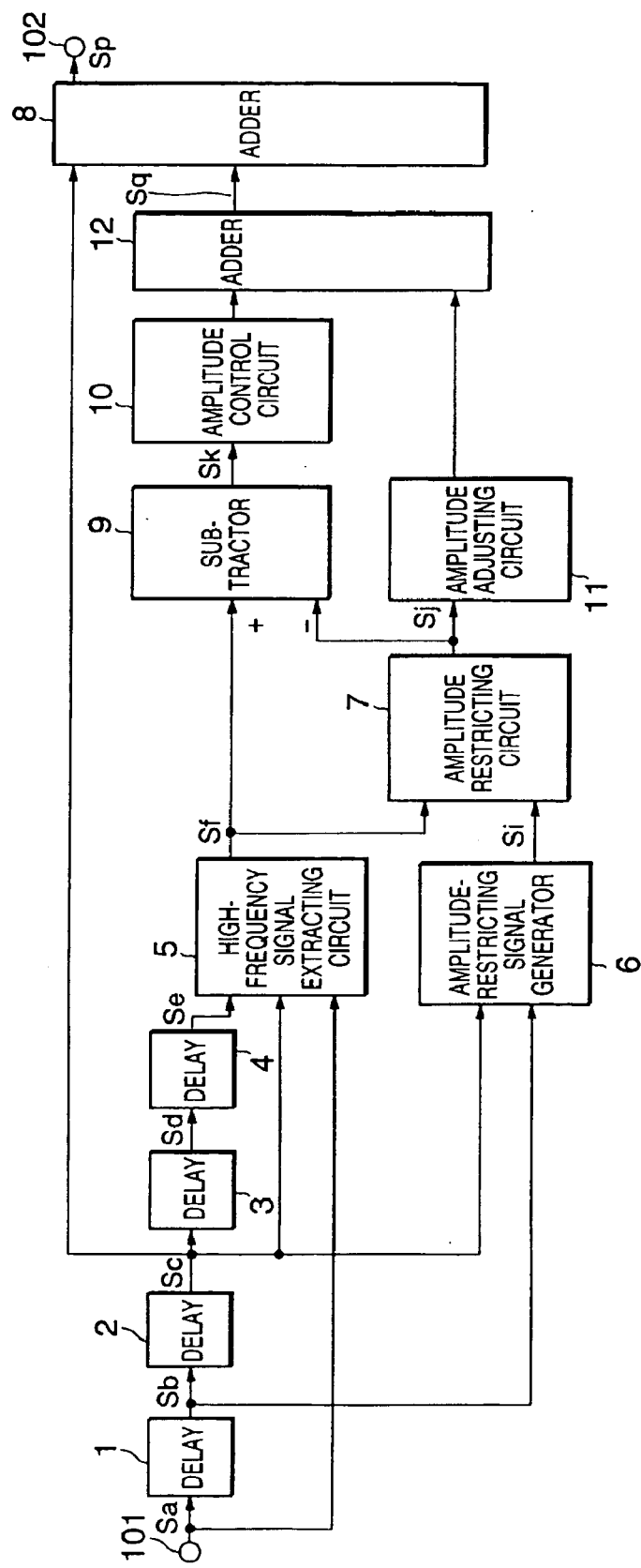
FIG. 7 is a block diagram showing an edge correcting circuit of Embodiment 2 of the invention.

FIG. 7 is an edge-correcting circuit of Embodiment 2 of the present invention. Signals appearing at various parts of the circuit of this embodiment are shown in FIGS. 8A to 8H and FIGS. 2A to 2F. The edge correcting circuit of this embodiment is generally identical to that of Embodiment 1, but is different in additionally having a subtractor 9, an amplitude control circuit 10, an amplitude adjusting circuit 11, and an adder 12.

Figure 8A:
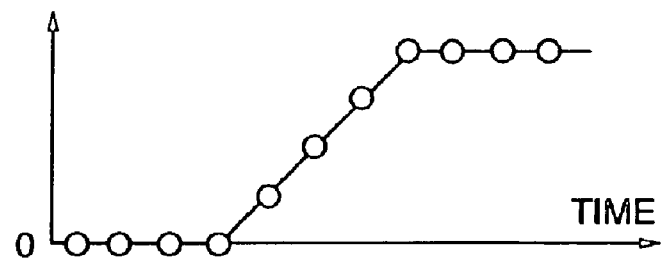
FIGS. 8A to 8H are diagrams showing signals appearing at various parts of the circuit of Embodiment 2 of the invention.
Figure 8B:
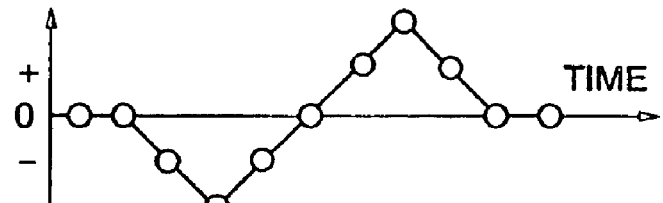
Figure 8C:
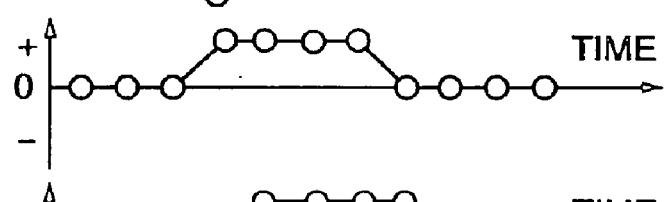
Figure 8D:
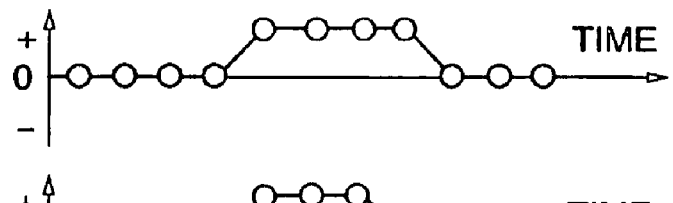
Figure 8E:
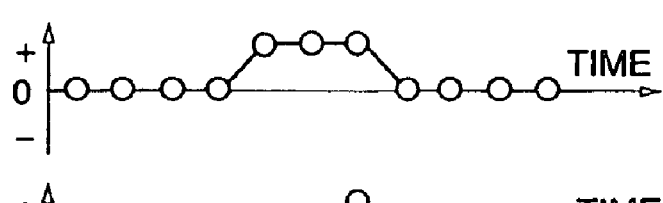
Figure 8F:
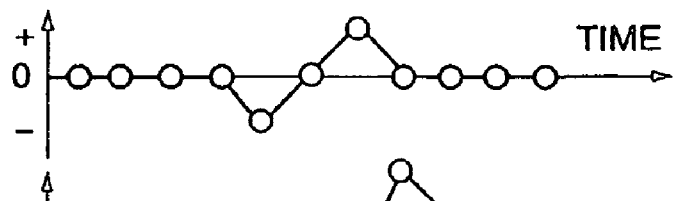
Figure 8G:
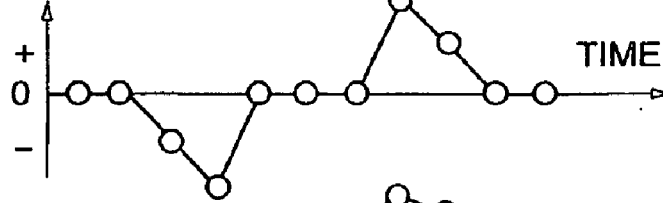
Figure 8H:
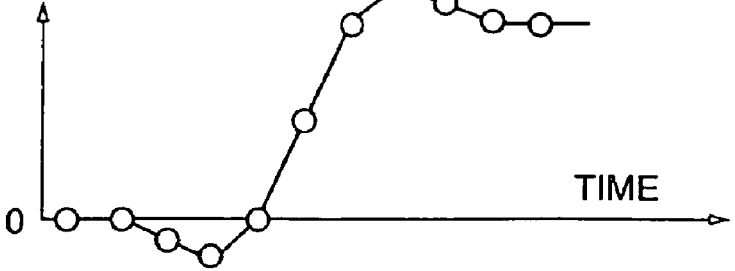

The subtractor 9 subtracts the inclination-improving signal Sj output from the amplitude restricting circuit 7, from the high-frequency signal Sf output from the high-frequency signal extracting circuit 5, to produce an overshoot signal Sk shown in FIG. 8G.

The amplitude control circuit 10 adjusts the amplitude of the overshoot signal Sk, and restricts the amplitude to within a predetermined value, by clipping. The amplitude adjusting circuit 11 adjusts the amplitude of the inclination-improving signal Sj output from the amplitude restricting circuit 7.

The adder 12 adds the output of the amplitude control circuit 10 and the output of the amplitude adjusting circuit 11. The adder 8 adds the output of the adder 12, and the signal Sc which is a delay-compensated original signal, to produce an edge-corrected signal Sp shown in FIG. 8H.

As has been described, rather than adding the inclination-improving signal Sj (FIG. 3F) to the original signal to produce an edge-corrected signal, as in Embodiment 1, Embodiment 2 obtains an edge corrected signal Sp (FIG. 8H) having optimum overshoot components and inclination by: extracting an overshoot signal Sk, by subtracting the inclination-improving signal Sj from the high-frequency signal Sf; and at the same time, adjusting the amplitude of the inclination-improving signal Sj; and determining the sum Sq of the amplitude-controlled overshoot signal Sk (the output of the amplitude control circuit 10) and the amplitude-adjusted inclination-improving signal (output of the amplitude adjusting circuit 11); and adding the sum Sp to the original signal Sc.

Incidentally, one of the amplitude control circuit 10 and the amplitude adjusting circuit 11 may be omitted.

According to Embodiment 2, the overshoot components and the components for improving the inclination of the edge can be adjusted independently, so that optimum edge correction can be achieved.

Embodiment 3

Figure 9:
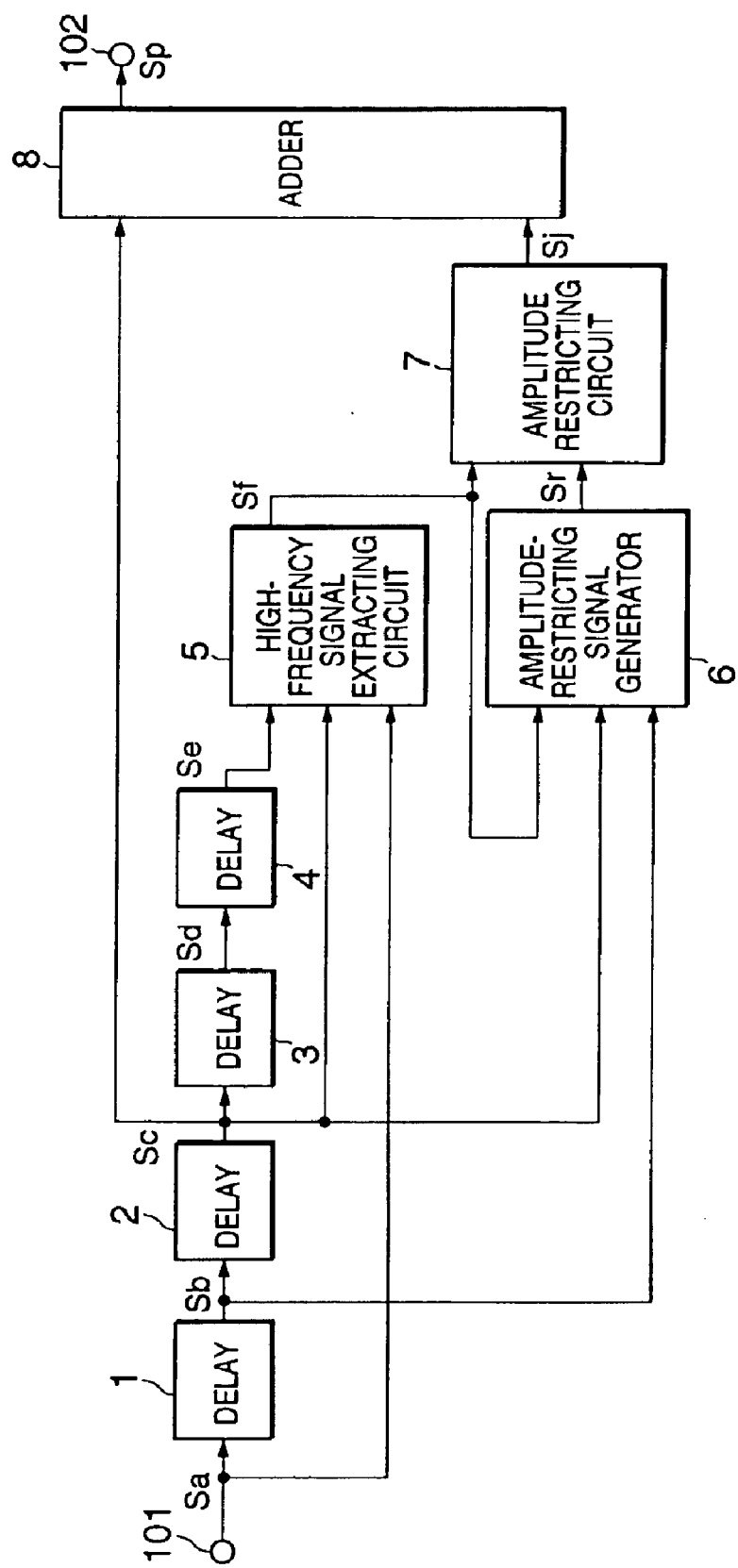
FIG. 9 is a block diagram showing an edge correcting circuit of Embodiment 3 of the invention.

FIG. 9 shows an edge correcting circuit of Embodiment 3 of this invention. Signals appearing at various parts of the circuit of Embodiment 3 are shown in FIGS. 10A to 10G and FIGS. 2A to 2F. Embodiment 3 is generally identical to Embodiment 1, but the amplitude-restricting signal generator 6 of FIG. 1 is replaced by an amplitude-restricting signal generator 13.

The amplitude-restricting signal generator 13 differs from the amplitude-restricting signal generator 6 in that it receives the high-frequency signal Sf output from the high-frequency signal extracting circuit 5, in addition to the output signals Sb and Sc from the one-pixel delay units 1 and 2, and generates, therefrom, an amplitude-restricting signal Si for removing the overshoot components.

Figure 11:
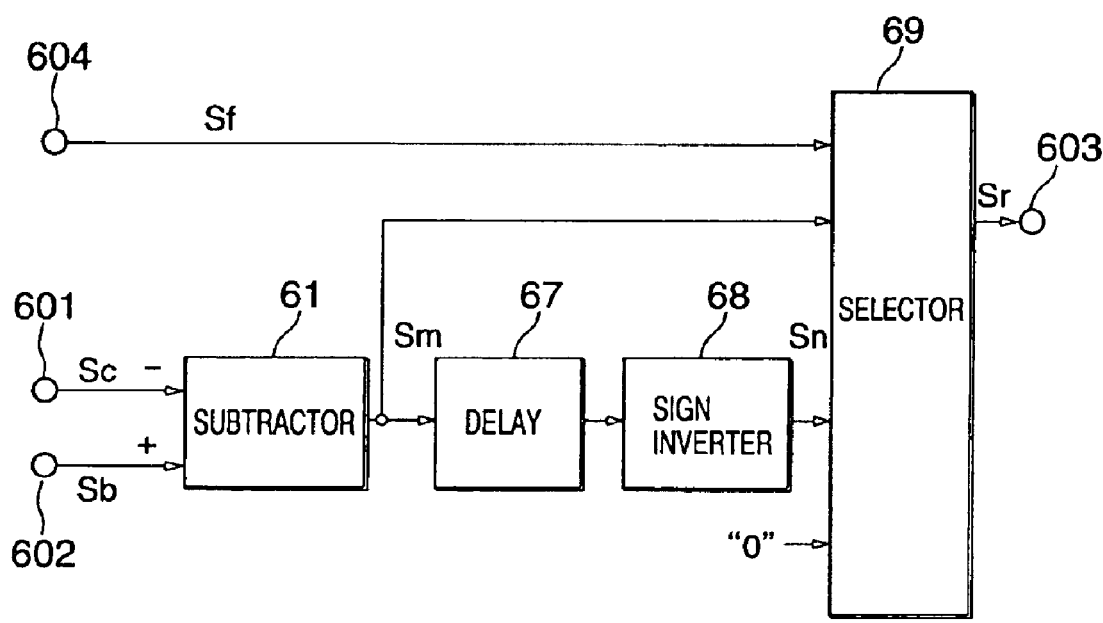
FIG. 11 is a block diagram showing an amplitude-restricting signal generator used in Embodiment 3 of the invention.

FIG. 11 shows details of the amplitude-restricting signal generator 13 of FIG. 9. In FIG. 11, reference numeral identical to those in FIG. 5 denote identical or corresponding members. As illustrated in FIG. 11, the amplitude-restricting signal generator 13 has an input terminal 601 for receiving the output signal Sc of the one-pixel delay unit 2, an input terminal 602 for receiving the output signal Sb of the one-pixel delay unit 1, and an output terminal 603, like the amplitude-restricting signal generator 6 of FIG. 5. It also has an input terminal 604 for receiving the high-frequency signal Sf output from the high-frequency signal extracting circuit 5.

The amplitude-restricting signal generator 13 also has a subtractor 61, a delay unit 67, a sign inverting circuit 68, and a selector 69. Like the subtractor 6 of FIG. 5, the subtractor 61 subtracts the signal Sc from the signal Sb, to produce a signal Sm shown in FIG. 10C. The output Sm of the subtractor 61 represents the result of the subtraction of the signal Sc of the target pixel from the signal Sb of a pixel shifted rightward by one pixel from the target pixel.

The one-pixel delay unit 67 delays the signal Sm by one pixel period. The sign inverting circuit 68 inverts the sign of the output signal of the one-pixel delay unit 67 to produce a signal Sn shown in FIG. 10D. The signal Sn is equivalent to the result of subtraction of the output signal Sc of the one-pixel delay unit 2 (i.e., the signal of the target pixel) from the output signal Sd of the one-pixel delay unit 3 (i.e., the signal of a pixel shifted leftward by one pixel from the target pixel).

The selector 69 receives the high-frequency signal Sf, the signal Sm, the signal Sn, and a signal representing tone "0," and selects one of the signal Sm, the signal Sn, and "0," and outputs the selected signal as the output signal Sr shown in FIG. 10E. If at least one of the signals Sm and Sn is zero or the signs of the signals Sm and Sn are identical, the selector 69 selects and outputs "0." If none of the signals Sm and Sn is zero, and the signs of the signals Sm and Sn are not identical, the selector 69 outputs that one of the signals Sm and Sn which has a sign identical to the high-frequency signal Sf. If the signal Sf is zero, it may be treated as positive or negative. In the illustrated example, it is treated as positive. In the illustrated example, the selector 69 receives the signal Sf, and determines the sign within the selector 69. However, a signal representing the sign of the signal Sf may be supplied to the selector 69. The output signal of the selector 69 is passed as the amplitude control signal Sr through the output terminal 607 to the amplitude restricting circuit 7.

The rest of the operation is similar to that of Embodiment 1. That is, the amplitude restricting circuit 7 removes the overshoot components which are components having an amplitude not smaller than the amplitude-restricting signal Sr, from the high-frequency signal Sf, to produce the signal Sj shown in FIG. 10F. The adder 8 adds the signal Sj to the original signal Sc, and an edge-corrected signal Sp shown in FIG. 10G is obtained at the output terminal 102.

As has been described, according to Embodiment 3, an edge-corrected image signal with the overshoots removed can be obtained.

It was stated in connection with Embodiment 1 that the amplitude-restricting signal generator 6 may have a function of varying the amplitude of the amplitude-restricting signal. The amplitude-restricting signal generator 13 of Embodiment 3 may have the same function of varying the amplitude of the amplitude-restricting signal.

Embodiment 4

Embodiment 2 is a modification of Embodiment 1 and is additionally provided with the subtractor 9, the amplitude control circuit 10, the amplitude adjusting circuit 11, and the adder 12 to enable adjustment of the overshoot signal Sk and the inclination-improving signal Sj, so that optimum picture quality can be obtained. Embodiment 3 may be modified in a similar manner.

Figure 12:
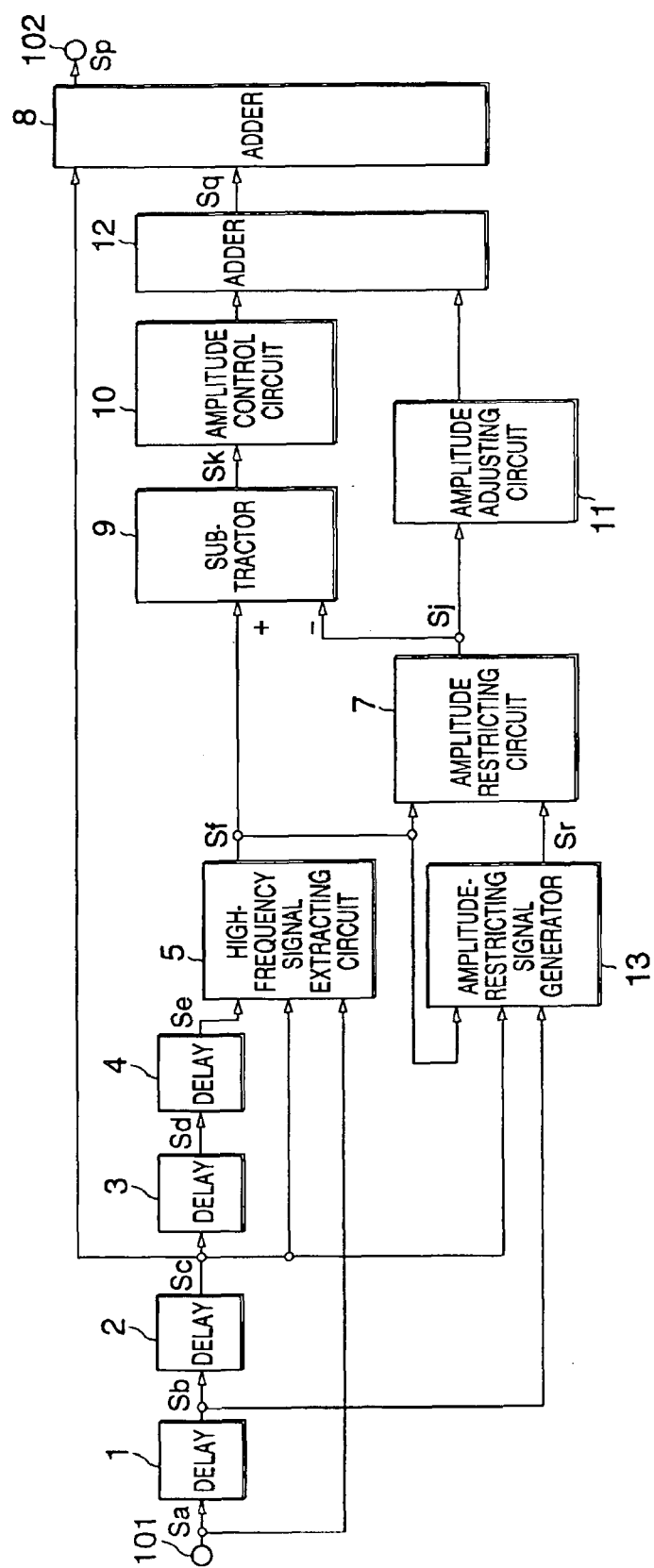
FIG. 12 is a block diagram showing an edge correcting circuit of Embodiment 4 of the invention.

FIG. 12 shows the configuration of an edge correcting circuit having such modifications as applied to Embodiment 3. The operations of the circuits 9, 10, 11 and 12 in FIG. 12 and the merits derived from the addition of these circuits are identical to those described in connection with Embodiment 2.

Embodiment 5

Figure 13:
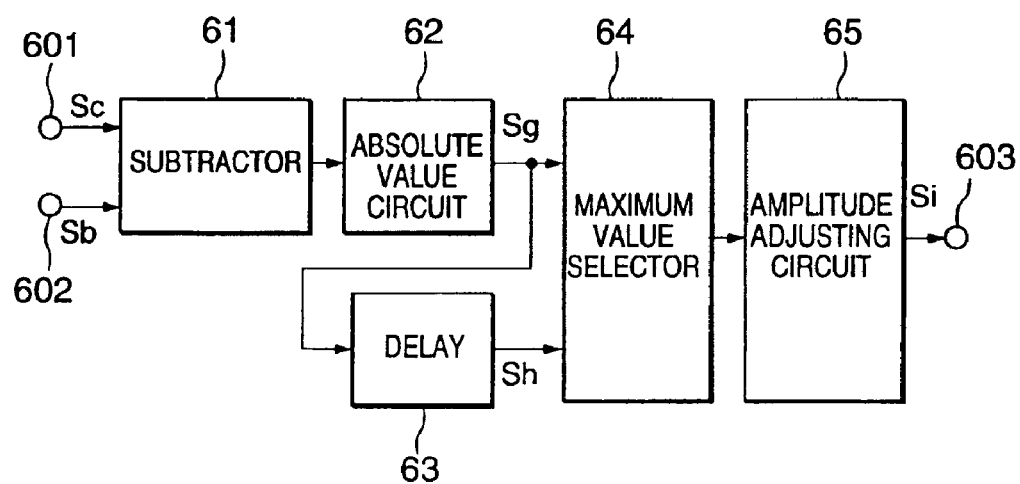
FIG. 13 is a block diagram showing an amplitude-restricting signal generator used in Embodiment 4 of the invention.

Embodiment 1 employs, as a constituting element of the amplitude-restricting signal generator 6, the minimum value selector 64 selecting the minimum value of the signals Sg and Sh. As an alternative, a maximum value selector 66 selecting the maximum value of the signals Sg and Sh may be used instead, as illustrated in FIG. 13. The signals appearing at various parts of the circuit of FIG. 13 are shown in FIGS. 14A to 14G and FIGS. 2A to 2F.

By using the maximum value selector in place of the minimum value selector 64, the amplitude-restricting signal Si, which is the output of the amplitude-restricting signal generator, will be as shown in FIG. 14E. The amplitude-restricting signal Si restricts the amplitude of the high-frequency signal Sf, and the inclination-improving signal Sj shown in FIG. 14F is obtained as the output signal of the amplitude restricting circuit 7. As the inclination-improving signal Sj is added to the signal Sc, which is a delay-compensated original signal, an edge-corrected signal Sp shown in FIG. 14G is produced.

Embodiment 6

Figure 15:
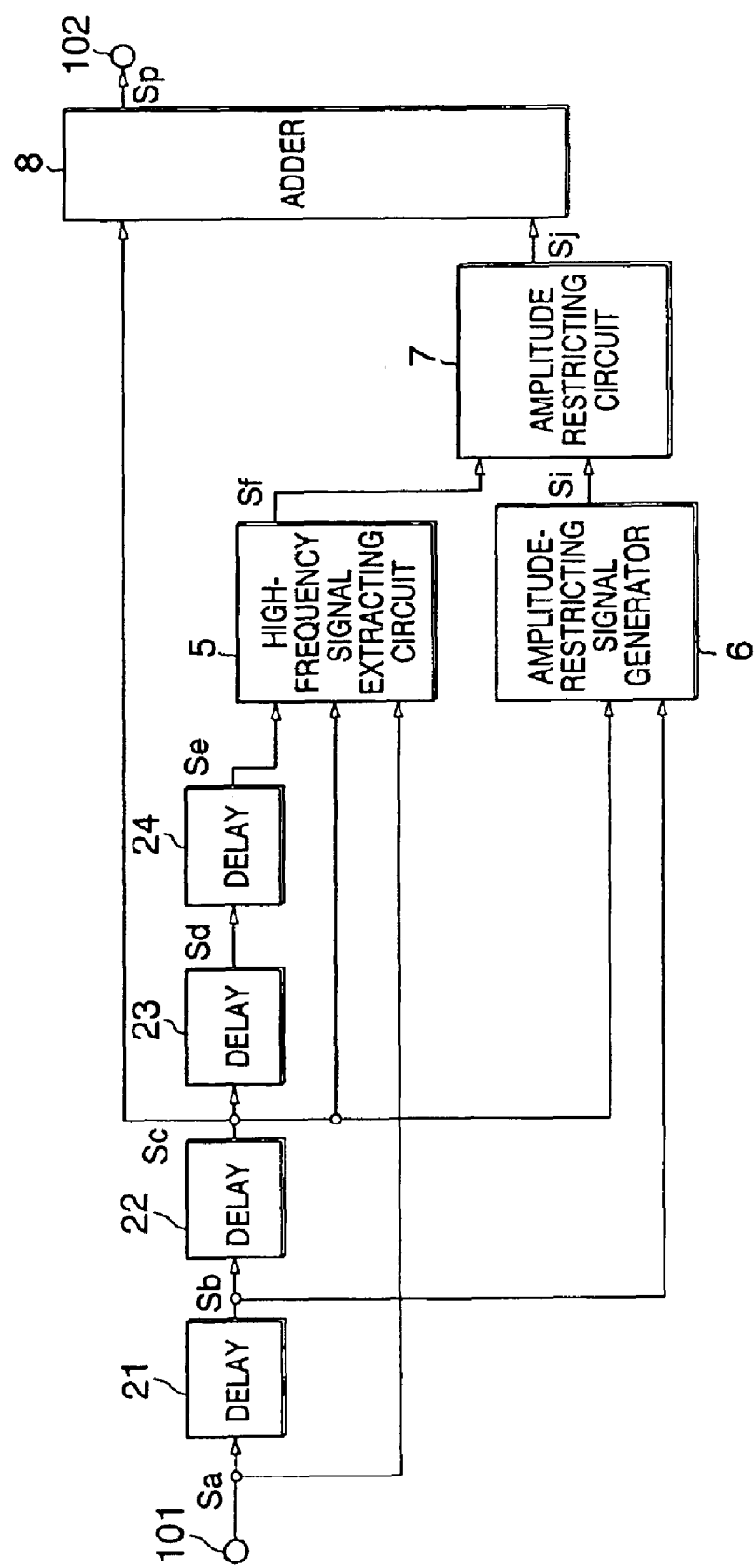
FIG. 15 is a block diagram showing an edge correcting circuit of Embodiment 6 of the invention.
Figure 16:
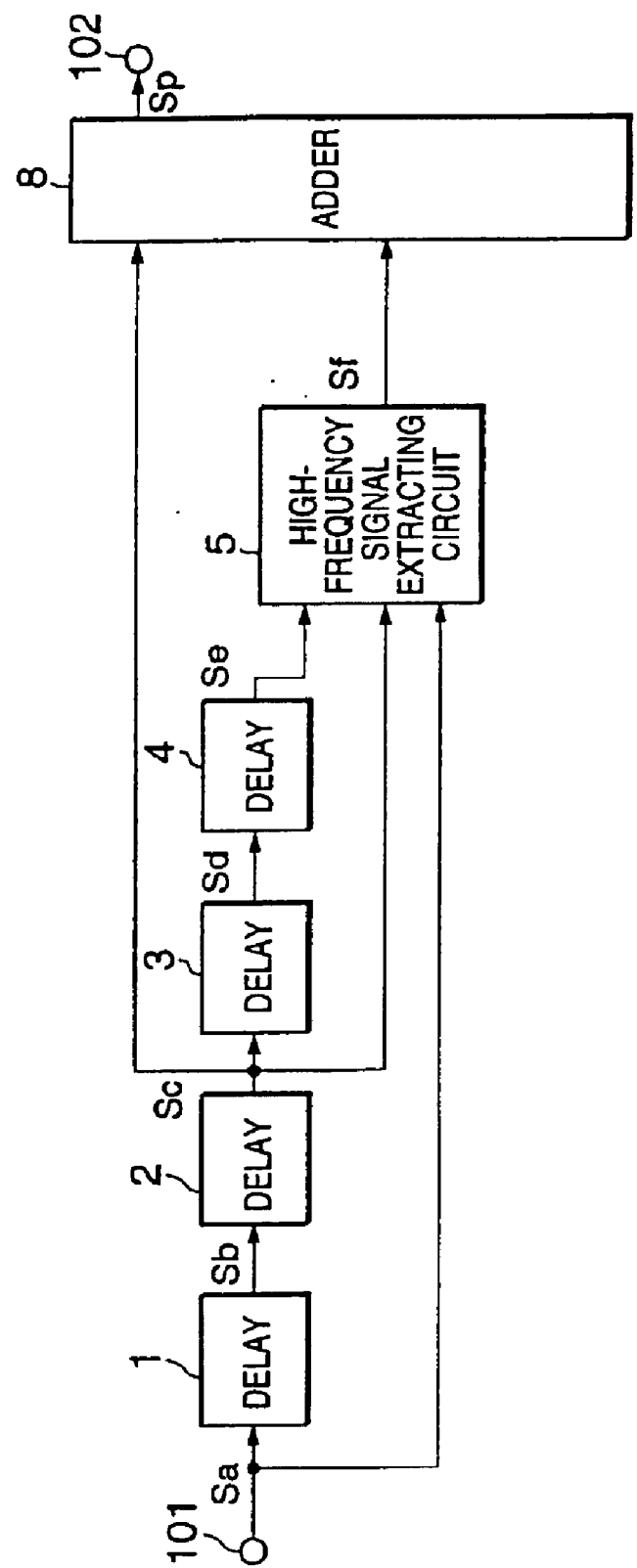
FIG. 16 is a block diagram showing a conventional edge correcting circuit.
Figure 17A:
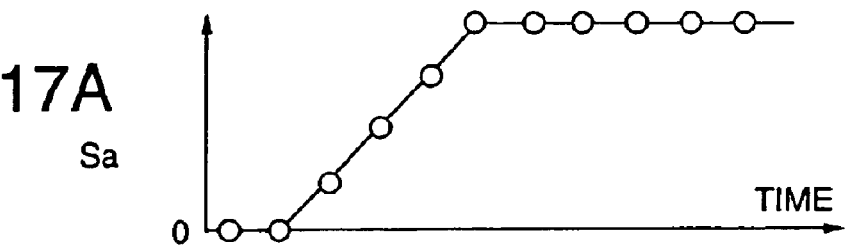
FIGS. 17A to 17E are diagrams showing signals at various parts of the conventional edge correcting circuit.
Figure 17B:
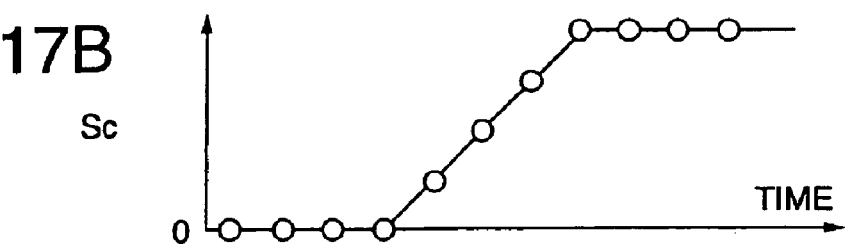
Figure 17C:
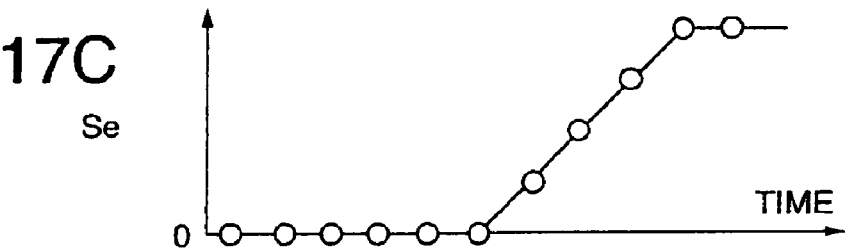
Figure 17D:
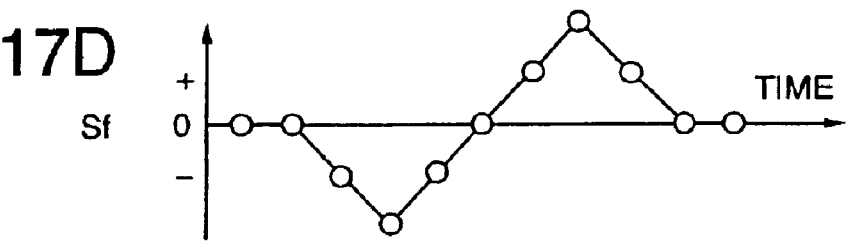
Figure 17E:
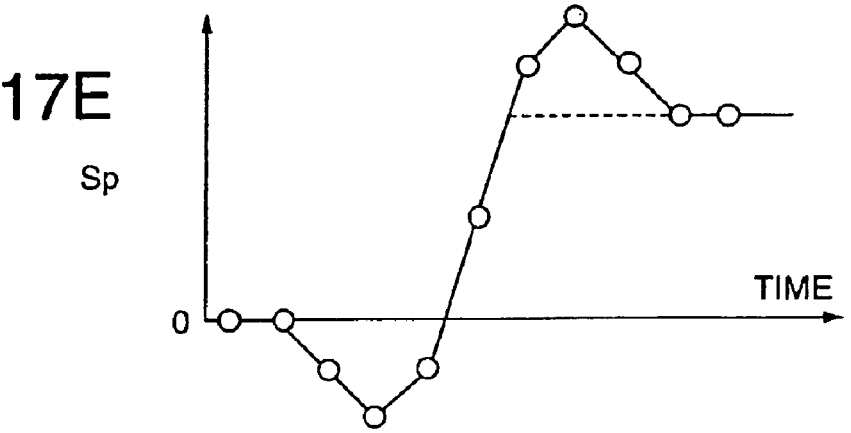

In Embodiments 1 to 5, one-pixel delay units are used to achieve horizontal edge correction. Replacement of the one-pixel delay units with one-line delay units will enable vertical edge correction. For instance, FIG. 15 shows an example in which the one-pixel delay units 1, 2, 3 and 4 in FIG. 1 have been replaced with one-line delay units 21, 22, 23 and 24.

Variations.

In the above embodiments, the signal of the target pixel, and the signals of the pixels shifted by two pixels from the target pixel are used to extract a high-frequency signal of the image, and the signal of the target pixel, and the signals of the pixels shifted by one pixel from the target pixel are used to generate an amplitude-restricting signal. To generalize, the signal of the target pixel, and the signals of the pixels shifted by m (m being an integer not smaller than two) pixels from the target pixel may be used to extract a high-frequency signal of the image, and the signal of the target pixel, and the signals of the pixels shifted by n (n being an integer not smaller than 1 and smaller than m) pixel from the target pixel may be used to generate an amplitude-restricting signal (Si), by for example taking the difference between them.

What is claimed is:

1. An edge correcting circuit of an image to be represented by a digitized image signal, comprising:

a high-frequency signal extracting circuit for extracting a high-frequency signal of the image by calculation based on a signal of a pixel which is to be corrected (hereinafter called a target pixel), a signal of a pixel shifted from the target pixel by m (m being an integer not smaller than 2) pixels in the right or lower direction, and a signal of a pixel shifted from the target pixel by m pixels in the left or upper direction;

an amplitude-restricting signal generator for determining an amplitude-restricting signal based on a minimum value or a maximum value of an absolute value of a difference between the signal of the target pixel and a signal of a pixel shifted from the target pixel by n (n being an integer not smaller than 1 and smaller than m) pixels in the right or lower direction, and an absolute value of a difference between the signal of the target pixel and a signal of a pixel shifted from the target pixel by n pixels in the left or upper direction;

an amplitude restricting circuit for restricting the output of the high-frequency extracting circuit so that the absolute value of the output of the high-frequency extracting circuit is not more than the output of the amplitude-restricting signal generator; and an adder for adding the output of the amplitude restricting circuit or a signal obtained therefrom, as an edge correction signal, to the signal of the target pixel.

2. The edge correcting circuit as set forth in claim 1, wherein said high-frequency extracting circuit has the function of altering the amplitude of the high-frequency signal output therefrom.

3. The edge correcting circuit as set forth in claim 1, wherein said amplitude-restricting signal generator has the function of altering the amplitude of the amplitude-restricting signal output therefrom.

4. The edge correcting circuit as set forth in claim 1, further comprising:

a subtractor for subtracting the output of the amplitude restricting circuit from the output of the high-frequency extracting circuit;

an amplitude control circuit for controlling the amplitude of the output of the subtractor; and a second adder for adding the output of the amplitude control circuit and the output of the amplitude restricting circuit;

wherein the output of the second adder is used as the edge correction signal.

5. The edge correcting circuit as set forth in claim 1, further comprising:

a subtractor for subtracting the output of the amplitude restricting circuit from the output of the high-frequency extracting circuit;

an amplitude adjusting circuit for adjusting the amplitude of the output of the amplitude restricting circuit; and a second adder for adding the output of the subtractor and the output of the amplitude adjusting circuit;

wherein the output of the second adder is used as said edge correction signal.

6. An edge correcting circuit of an image to be represented by a digitized image signal, comprising:

a high-frequency signal extracting circuit for extracting a high-frequency signal of the image by calculation based on a signal of a pixel which is to be corrected (hereinafter called a target pixel), a signal of a pixel shifted from the target pixel by m (m being an integer not smaller than 2) pixels in the right or lower direction, and a signal of a pixel shifted from the target pixel by m pixels in the left or upper direction;

an amplitude-restricting signal generator for determining an amplitude-restricting signal based on a difference between the signal of the target pixel and a signal of a pixel shifted from the target pixel by n (n being an integer not smaller than 1 and smaller than m) pixels in the right or lower direction, and a difference between the signal of the target pixel and a signal of a pixel shifted from the target pixel by n pixels in the left or upper direction;

an amplitude restricting circuit for restricting the output of the high-frequency extracting circuit so that the absolute value of the output of the high-frequency extracting circuit is not more than the output of the amplitude-restricting signal generator; and an adder for adding the output of the amplitude restricting circuit or a signal obtained therefrom, as an edge correction signal, to the signal of the target pixel;

wherein said amplitude-restricting signal generator outputs "0" when a first difference value obtained by subtracting the signal of the target pixel from the signal of the pixel shifted by n pixels from the target pixel in the right or lower direction, and a second difference value obtained by subtracting the signal of the target pixel from the signal of the pixel shifted by n pixels from the target pixel in the left or upper direction are of the same sign (or at least one of them is zero), and said amplitude-restricting signal generator selectively outputs that one of the first and second difference values which is of the same sign as the output of the high-frequency extracting circuit, when neither of the first and second difference values is zero, and the first and second difference values have different signs.

7. The edge correcting circuit as set forth in claim 6, wherein said high-frequency extracting circuit has the function of altering the amplitude of the high-frequency signal output therefrom.

8. The edge correcting circuit as set forth in claim 6, wherein said amplitude-restricting signal generator has the function of altering the amplitude of the amplitude-restricting signal output therefrom.

9. The edge correcting circuit as set forth in claim 6, further comprising:

a subtractor for subtracting the output of the amplitude restricting circuit from the output of the high-frequency extracting circuit;

an amplitude control circuit for controlling the amplitude of the output of the subtractor; and a second adder for adding the output of the amplitude control circuit and the output of the amplitude restricting circuit;

wherein the output of the second adder is used as the edge correction signal.

10. The edge correcting circuit as set forth in claim 6, further comprising:

a subtractor for subtracting the output of the amplitude restricting circuit from the output of the high-frequency extracting circuit;

an amplitude adjusting circuit for adjusting the amplitude of the output of the amplitude restricting circuit; and a second adder for adding the output of the subtractor and the output of the amplitude adjusting circuit;

wherein the output of the second adder is used as said edge correction signal.

11. An apparatus for correcting an edge of an image, comprising:

a first circuit to generate a high-frequency signal, the high-frequency signal being generated from an input signal, representing an image, of a target pixel, and at least two time-shifted versions of said input signal including a one time-shifted version having at least a two-pixel shift in a first direction to the target pixel and the other time-shifted version having at least a two-pixel shift in an alternative direction;

a second circuit to generate a signal to restrict amplitude, the signal being generated from the input signal of the target pixel, and at least one further time-shifted version of said input signal including a further time-shifted version having at least a one-pixel shift from the target pixel and less than the at least two-pixel shifted versions being input to the first circuit;

a third circuit to generate an output signal from the high-frequency signal and the signal to restrict amplitude, the output signal having a maximum amplitude substantially limited to amplitude of the signal to restrict amplitude; and an adder to add the output signal and the input signal of the target pixel to generate a modified signal of the target pixel to correct an edge of said image.

12. The apparatus of claim 11, further comprising:

at least a fourth circuit to generate an output signal to be input to said adder, from the output signal generated by the third circuit, to maintain at least a portion of overshoot in the modified signal of the target pixel to correct the edge of the image.

13. The apparatus of claim 11, wherein at least two of said first, second, and third circuits are a single circuit.

14. A method for correcting an edge of an image, comprising:

generating a high-frequency signal from an input signal, representing an image, of a target pixel, and at least two time-shifted versions of said input signal including one time-shifted version having at least a two-pixel shift in a first direction to the target pixel and the other time-shifted version having at least a two-pixel shift in an alternative direction;

generating a signal to restrict amplitude from the input signal of the target pixel, and at least one further time-shifted version of said input signal including a further time-shifted version having at least a one-pixel shift from the target pixel and less than the at least two-pixel shifted versions;

generating an output signal from the high-frequency signal and the signal to restrict amplitude, the output signal having a maximum amplitude substantially limited to amplitude of the signal to restrict amplitude; and adding the output signal and the input signal of the target pixel to generate a modified signal of the target pixel to correct an edge of said image.

15. The method of claim 14, further comprising:

generating another output signal, from the output signal generated by the high-frequency signal, to maintain at least a portion of overshoot in the modified signal of the target pixel to correct the edge of the image.

* * * * *